Aug. 14, 1956  W. J. FITZSIMMONS  2,758,854
JOURNAL BOX SEAL
Filed April 14, 1953
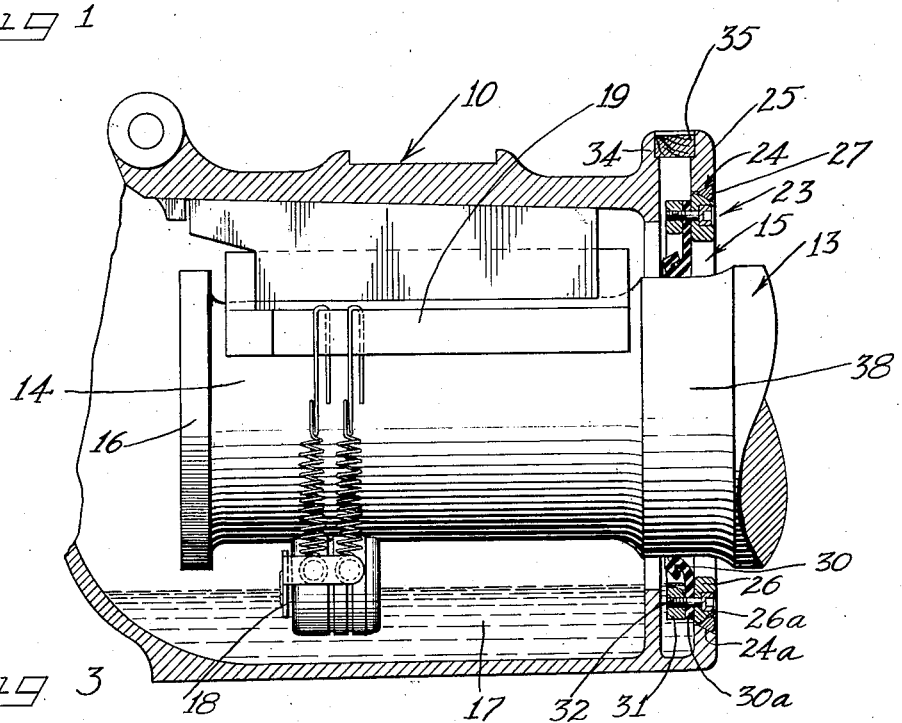
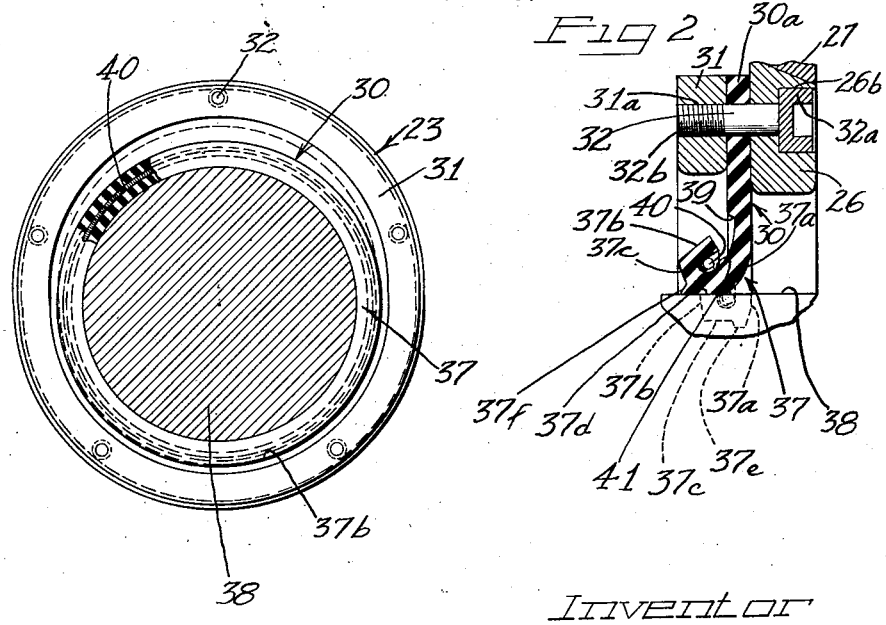
Inventor
William J. Fitzsimmons United States Patent Office 2,758,854
Patented Aug. 14, 1956

2,758,854

JOURNAL BOX SEAL

William J. Fitzsimmons, Chicago, Ill.

Application April 14, 1953, Serial No. 348,731

7 Claims. (Cl. 286—6)

This invention relates to a bearing seal adapted particularly for the use in journal boxes of railway passenger cars, freight cars and the like. More particularly, the invention relates to a bearing seal adapted to be disposed about the axle of a railway car for sealing the aperture between the axle and a journal box within which an end of the axle is inserted, in order to keep foreign matter from entering the journal box and to retain lubricant in the journal box.

According to the present invention, a journal box for a railway car has the end portion of an axle extending thereinto, and a bearing seal is disposed about the axle and includes a sealing member of rubber-like material in slidable sealing relation with the axle, and a backing plate secured to a wall of the journal box together with means for clamping the outer margin of the rubber sealing member to the backing plate. The inner margin of the rubber sealing member has a generally hook shape for receiving a tensioning spring and is provided with means affording a wiping edge when deformed by an axle extending therethrough.

It is, therefore, an important object of the present invention to provide a bearing seal for a journal box wherein a wall of the journal box has an inner margin providing an aperture and a backing ring is secured liquid-tight within the aperture to form an extension of the inner margin of the wall and a rubber sealing member has an outer margin clamped to the backing ring in liquid-tight relation and has an inner margin in sealing relation to the axle to prevent leakage of lubricant from the journal box.

Another object of the present invention is to provide a seal with which a tension spring may be readily assembled and replaced and which provides a wiping edge to prevent loss of lubricant from a journal box or the like with which the seal may be associated.

A further object of this invention is to provide a bearing seal which may be clamped to a wall of a journal box by means accessible from the exterior of the box.

It is still another object of this invention to provide a bearing seal which may be readily applied to existing conventional journal boxes and may be applied as an assembled unit.

Other objects, features and advantages of the present invention will be readily apparent from the following detailed description of a preferred embodiment thereof taken in conjunction with the accompanying one sheet of drawings in which:

On the drawings:

Figure 1 is a partial longitudinal sectional view on the railway car journal box containing the end portion of an axle and having a bearing seal according to the present invention installed therein;

Figure 2 is an enlarged fragmentary sectional view of a portion of Figure 1; and Figure 3 is a side elevational view of a bearing seal assembly according to the present invention.

As shown on the drawings:

In Figure 1 there is illustrated by way of example a journal box 10 for attachment to a railway car and to which the bearing seal of the present invention may be applied. An axle 13 has a journal 14 extending into the journal box through an aperture 15 at one end of the journal box 10. The journal 14 is smaller in diameter than the axle 13 and has an annular flange 16 formed at its outer end which is also the end of the axle 13. The lower portion of the journal box 10 contains a pool of lubricant 17 therein. A journal lubricator assembly 18, partly immersed in the pool of lubricant 17, is adapted to apply lubricant to the journal 14. A bearing assembly 19 is disposed in bearing relation about the upper portion of the journal 14 and serves to transmit the weight of the railway car to the axle 13 and to the railway wheel attached thereto (not shown) which rests on the track.

In order to prevent loss of lubricant from the journal box and to prevent foreign matter from entering the journal box, a bearing seal assembly 23 is provided to close the gap between the axle and the edge 24 of an exterior wall 25 of the journal box 10. The bearing seal 23 includes a backing ring 26 of the metallic material such as steel which has an outside diameter only slightly less than the edge 24 so as to extend in closely spaced relation thereto. As seen in Figure 1, the edge 24 may include a beveled portion 24a and the backing ring may have a complemental beveled portion 26a for convenience in welding the backing ring to the wall 25 as indicated at 27. It will be appreciated that the backing ring 26 may be secured with the wall 25 by means of a leak proof joint to prevent leakage of the lubricant. The backing ring preferably has a thickness corresponding to the thickness of the wall 25 with the opposite faces of the backing ring flush with the opposite faces of the wall 25.

One of the purposes of the backing ring 26 is to provide means by which the bearing seal may readily be applied to existing journal boxes. The backing ring may, of course, be more readily machined and formed to serve its function with the remainder of the bearing seal assembly than could an integral portion of the journal box itself. However, it will be apparent that the journal box wall 25 could be formed to provide the functions of the backing ring 26. In the claims, therefore, the term "wall" of the journal box may include a backing ring secured thereto as illustrated in the drawings as well as an integral portion of the wall serving the function of the backing ring.

Associated with the backing ring 26 is a sealing member 30 preferably of a rubber-like material having its outer margin 30a overlying the backing ring 26 and clamped thereto by means of a holding ring 31 which may also be of metallic material such as steel. As indicated in Figures 1 and 3 and in greater detail in Figure 2, Allen screws 32 may be utilized for securing the holding ring 31 in clamping relation, and the Allen screws may have heads 32a disposed in recesses 26b in the backing ring 26 and may have threaded ends 32b in engagement with threaded holes 31a in the holding ring 31. It will be observed that the combined thickness of the sealing member 30 and holding ring 31 is less than the width of the journal box dust guard well between the inner wall or flange 34 and the outer wall 25 of the journal box, so that the holding ring 31 and sealing member 30 may be removed and replaced through the customary aperture 35 at the top of the journal box. Further, it will be noted that the screws 32 are accessible to clamp the holding ring in place from the exterior of the journal box by virtue of the exterior access to the heads 32a of the screws.

In the initial assembly of the bearing seal with the journal box, the bearing seal 23 may be assembled with the journal box as a complete unit such as shown in Figure 3, but once the backing ring 26 is welded with the journal box, the sealing member 30 may be replaced as desired through the aperture 35 at the top of the journal box. It will be further understood that the clamping of the seal against the backing ring 26 may be sufficient to seal the juncture therebetween against any leakage of lubricant from the journal box.

As best seen in Figure 2, the sealing member 30 has a generally J-shaped margin 37 for sealing engagement with the section 38 of the axle 13. As indicated in Figure 2 in dotted outline, the margin 37 normally assumes an orientation with the longer leg of the J indicated at 37a extending generally radially and parallel to the shorter leg 37b, with the joining portion 37c extending generally axially and spaced inwardly from the outer diameter of the section 38 of the axle. When, however, the axle is inserted through the aperture provided by the sealing member 30, the sealing member margin 37 is deformed to the general position indicated in Figure 2 with a portion 37d of the longer leg portion 37a of the margin presenting a contacting surface to the section 38. A rib 37e located generally at the juncture between the joining portion 37c and the longer leg portion 37a of the margin projects generally radially inwardly in normal position of the margin and may be of appreciable axial extent. When an axle is assembled with the sealing member, it will be observed that the rib 37e is preferably arranged so as to be distorted to provide a relatively sharp wedge shaped wiping edge 37f for preventing leakage of lubricant between the portion 37d and the section 38 of the axle.

It will be observed that the margin 37 is of reduced thickness relative to the outer margin 30a of the sealing member as by means of an undercut at 39 to provide increased flexibility and that a spring 40 may be very conveniently inserted in the crook 41 of the J-shaped margin 37 for increasing the radially inward pressure exerted by the sealing member 30 on the axle. As shown in Figure 2, this crook 41 is inclined when the axle is inserted and the spring 40 acts on the inclined portion to also exert a component force tending to rock the crook back into a straight position and thus bias the inner marginal portion of the seal ring toward the backing ring 26. The spring 40 may be arranged to form a ring and may be of a coil type, its ends being secured together by means of a section of coil spring wound more tightly than, and inserted into, the opposite ends of the main coil spring, the tendency of the spring section to expand retaining the ends of the main spring therewith to form the ring.

The inner peripheries of the backing ring 26 and the holding ring 31 as shown in Figures 1 and 3, are closer to the axle section 38 at the bottom thereof than at the top thereof so that ample clearance is afforded in the event the journal box rides down or drops relative to the axle. As shown in Figure 3, the inner peripheries of the rings are oval shape to lie in eccentric relation to the axle so that the gap between these rings and the axle is wider at the top than at the bottom. The rubber seal ring 30 has a circular inner periphery to hug the circular axle while the outer periphery of this ring is also oval shape or eccentric to fill the eccentric gap and lie between the holding and backing ring as shown.

From the foregoing description it will be understood that the present invention provides a novel bearing seal for railway journal boxes in order to prevent the entry of foreign matter into the journal box and to prevent loss of lubricant therefrom. The sealing member serves both to prevent leakage between its inner margin and the axle and between its outer margin and the backing ring of 26. Further, it will be apparent that the bearing seal assembly is readily applied to existing conventional journal boxes, and the sealing member may be conveniently removed and replaced as desired. Also the seal readily and conveniently accommodates a tensioning spring and at the same time provides a wiping edge to prevent leakage of lubricant along the axle. It may be noted that the rib 37e may be of some width in its normal condition, but will be distorted to provide a knife-edge type configuration when assembled with the axle.

It will be understood that modifications and variations may be affected without departing from the scope of the novel concepts of the present invention.

I claim as my invention:

1. In combination, a journal box having a plate-like annular flange defining an exterior wall of the journal box and disposed in a radial plane with respect to the axis of said journal box, the flange being beveled at its radially inner exterior edge, and a sealing sub-assembly disposed radially inwardly of said flange and having an exterior annular face flush with the exterior wall provided by said journal box flange, said sealing sub-assembly comprising a first ring member of flat plate construction providing said sub-assembly annular face and having a plurality of counter-sunk apertures therethrough and a beveled radially outer exterior edge cooperating with the beveled flange edge to define a generally V-shaped groove at the exterior of said journal box, means deposited in said groove welding said first ring member in flush relation to the flange exterior wall of the journal box, a sealing member having an outer margin within said journal box and overlying said first ring member, a second ring member within said journal box of flat plate construction and overlying the outer margin of the sealing member, and screw means disposed in the countersunk apertures of the first ring member and extending through the outer margin of the sealing member and engaging the second ring member to clamp the sealing member between the ring members to mount said sealing member in said journal box.

2. A bearing seal for insertion in a journal box aperture comprising a sealing member of flexible material having an outer margin portion for clamping to a journal box and an inner freely deflectable margin portion defining an aperture therethrough, said inner margin portion comprising a J-shaped portion of substantially uniform thickness including a straight radial longer leg portion, a generally right angularly related inner axially extending portion providing a cylindrical radially inwardly directed face of axial extent generally equal to three times said uniform thickness, said axially extending portion including an annular radially inwardly projecting rib providing approximately one-third of said cylindrical face and offset radially inwardly from the remaining approximately two-thirds of said cylindrical face, said rib being disposed on the side of said axially extending portion connected with said longer leg portion, and a shorter leg portion extending generally at right angles and radially outwardly from the extremity of said axially extending portion and of length at least approximately equal to said uniform thickness, said inner margin being deformed by insertion of an axle through the aperture thereof to present a portion of the long leg in sealing contacting relation to the axle with the rib being deformed by the axle to present an axially directed wiper edge facing the interior of a journal box with which the seal is associated.

3. A railroad car journal box axle seal adapted for mounting through the opening in the top of a journal box into the dust guard well of the journal box between the inner and outer walls of the well to sealingly engage the portion of the car axle rearwardly from the axle journal portion which comprises an extension on the outer wall of the well of the journal box radially inward of the inner wall of said well, said extension defining an opening adapted to receive an axle freely therethrough, a holding ring in said well having a larger opening than said extension, a rubber seal ring having an outer marginal portion between said extension and holding ring, screw means carried by said extension and extending through said outer marginal portion into the holding ring and extension, said seal ring extending radially inward from the holding ring and adapted to flex into the aperture of the holding ring, said seal ring having a generally J-shaped inner marginal portion integral with the outer marginal portion of the ring, said inner marginal portion including a rib defining the axle receiving aperture of the seal and having a diameter less than the axle diameter to mate snugly with the axle, a generally axially extending annular portion radially outward from said rib on the face of the seal ring adjacent the holding ring and surrounded by said holding ring in spaced relation therefrom, a radially outturned end leg on said axially extending portion cooperating therewith and with the inner marginal portion of the seal ring to define an annular recess, and contractible spring means seated in said recess, whereby insertion of the axle through the aperture of the seal ring defined by the rib will incline the J-shaped inner marginal portion of the seal ring into the holding ring aperture to cause the spring means to act on an inclined surface of the seal ring to simultaneously contract the rib into good wiping contact with the axle while urging the seal toward the extension to lie within the dust guard well area.

4. A railroad car journal box axle seal adapted for mounting through the opening in the top of the journal box into the dust guard well of the journal box between the inner and outer walls thereof, said journal box having an extension on the outer wall of the well projecting radially inward of the inner wall of the well, a metal holding ring in the well having a larger opening than said extension, a rubber seal ring having an outer marginal portion between the holding ring and the inward extension of the outer wall of the journal box, fastening means projecting through said extension on the outer wall of the journal box and the outer marginal portion of said seal ring into the holding ring to clamp the seal ring between the journal box and holding ring, said seal ring having a thickened portion adjacent the inner peripheral margin thereof defining an outwardly opening groove, a rib on the inner marginal periphery of the seal ring inwardly from said groove and aligned with the face of the ring adjacent the extension of the journal box, said rib defining a central opening in the ring of smaller diameter than the axle to be inserted into the journal box for inward deformation of the inner marginal portion of the seal ring toward the interior of the journal box, said groove having an inclined wall portion when the inner margin of the seal ring is deformed by the axle, and a contracting spring means in said groove acting on said inclined wall to contract the rib into good wiping contact with the axle while simultaneously urging the seal ring outwardly to lie against the extension of the journal box and within the confines of the well.

5. A railroad car journal box axle seal adapted to lie within the narrow confines of a journal box dust guard well to ride on the narrow enlarged axle area immediately rearward from the reduced diameter axle journal portion which comprises an apertured backing wall on the journal box, a holding ring in said well confronting said backing wall, said backing wall and holding ring having inner peripheries around the apertures thereof lying in eccentric relation to said enlarged axle area to provide wider gaps between the axle and said wall and ring at the top than at the bottom thereof, said holding ring aperture registering with but being larger than the aperture of the backing wall to expose the inner marginal portion of the backing wall, a rubber seal ring having a circular inner periphery and an outer periphery eccentric to the inner periphery to provide therebetween a flat plate-like outer marginal portion, means clamping said outer marginal portion between the backing wall and holding ring, said rubber seal ring having an aperture smaller than said narrow enlarged axle portion whereby insertion of the axle in position in the journal box will deflect the inner marginal portion of the seal ring into the aperture of the holding ring for riding on said enlarged axle portion.

6. A railroad car journal box axle seal adapted to lie within the narrow confines of a journal box dust guard well to ride on the narrow enlarged axle area immediately rearward from the reduced diameter axle journal portion which comprises an apertured backing wall on the journal box, an apertured holding member in said well confronting said backing wall, the apertures of said backing wall and said holding member being bounded by peripheries lying in eccentric relation to said enlarged axle area in spaced relation from said axle area, said eccentric relation being such to provide a wider gap at the top of the axle area than at the bottom thereof, said holding member aperture registering with but being larger than the aperture of the backing wall to expose the inner marginal portion of the backing wall, a rubber seal ring having an inner periphery and an outer periphery eccentric to said inner periphery to provide therebetween a flat platelike outer marginal portion, means clamping said outer marginal portion between said backing wall and said holding member, the inner periphery of said rubber seal ring having a smaller diameter than said narrow enlarged axle portion to deflect the inner marginal portion of the seal ring into the aperture of the holding member when the axle is inserted in position in the journal box, and a spring surrounding the deflected inner marginal portion of the seal ring to urge said portion into sealing relation on said enlarged axle portion.

7. A railroad car journal box seal adapted to lie within the narrow confines of a journal box dust guard well to ride on the narrow enlarged axle portion immediately rearward from the reduced diameter axle portion which comprises an apertured backing wall on the journal box, a holding ring in said well confronting said backing wall and having an aperture registering with but larger than the aperture of the backing wall to expose the inner marginal portion of the wall, a rubber seal ring having an outer marginal portion clamped between the backing wall and holding ring and a J-shaped inner marginal portion with the crook of the J opening outward within the aperture of the holding ring in spaced relation from the holding ring and defining an outwardly opening groove around the inner periphery of the seal ring, said inner periphery of the seal ring defining an aperture sized for snugly receiving said narrow enlarged axle portion to seat the inner periphery of the seal ring on said narrow enlarged axle portion, said seating fit of the inner periphery of the seal ring causing the J-shaped inner marginal portion of the seal ring to rock and assume an inclined position in the aperture of the holding ring when the axle is inserted through the apertured backing wall of the journal box to align the narrow enlarged axle portion with the well of the journal box, the crook of the thus rocked J-shaped inner marginal portion having an inclined leg defining the underside of said groove, and a contractible spring in said groove acting on said inclined leg to simultaneously bias the sealing ring radially inward into good wiping contact with said narrow enlarged axle portion and axially toward the aperture of the backing wall against the exposed portion of the backing wall.

References Cited in the file of this patent

UNITED STATES PATENTS

| 1,169,271 | Laycock | Jan. 25, 1916 |
| 1,989,110 | Penniman | Jan. 29, 1935 |
| 2,105,871 | Vigne | Jan. 18, 1938 |
| 2,177,441 | Pesarese | Oct. 24, 1939 |
| 2,371,823 | Jackson | Mar. 20, 1945 |
| 2,698,194 | Becker | Dec. 28, 1954 |

FOREIGN PATENTS

| 24,662 | Great Britain | 1913 |
| 583,818 | Great Britain | Dec. 31, 1946 |
| 874,527 | France | May 4, 1942 |